Aug. 25, 1964        C. N. COOPER        3,145,862
TURNING ROLL ASSEMBLY WITH ELEVATING MECHANISM
Filed June 25, 1962        2 Sheets-Sheet 1
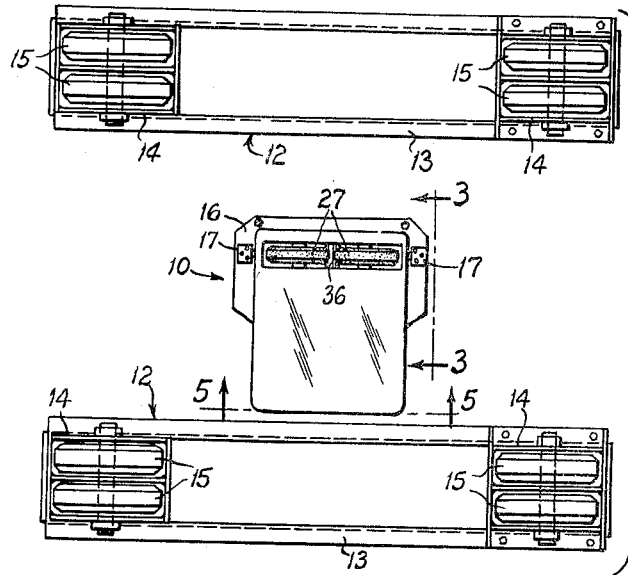
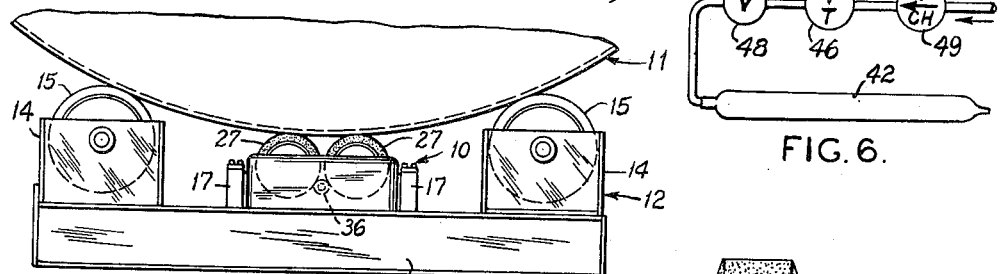
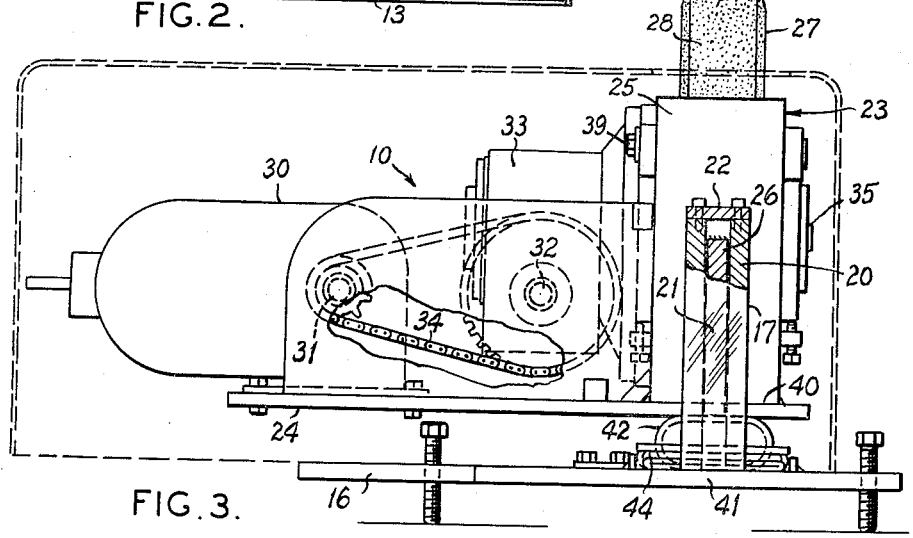
INVENTOR,
CLEVELAND N. COOPER.
BY Cohn and Powell
ATTORNEYS.

INVENTOR,
CLEVELAND N. COOPER.
BY Cohn and Powell
ATTORNEYS.

United States Patent Office 3,145,862
Patented Aug. 25, 1964

3,145,862
TURNING ROLL ASSEMBLY WITH ELEVATING
MECHANISM
Cleveland N. Cooper, Kirkwood, Mo., assignor to The Pandjiris Weldment Co., St. Louis, Mo., a corporation of Missouri
Filed June 25, 1962, Ser. No. 205,029
5 Claims. (Cl. 214—340)

This invention relates generally to improvements in a turning roll assembly, and more particularly to improvements in driving a workpiece during welding operations.

It is an important objective to provide a turning roll that is adapted only to engage and rotate a workpiece such as a cylindrcial tank so as to pass a plate juncture under a welding head, and which is not adapted to support such workpiece. Other idler rolls of conventional type are utilized to support the workpiece precisely in a predetermined position and to permit the workpiece to turn when driven by the independent drive roll assembly constituting this invention.

An important object is achieved by the provision of an elevating mechanism in the drive roll assembly which automatically adjusts the height of the drive wheels to compensate for any contour or surface irregularities of the workpiece upon engagement of the wheels with the workpiece.

Another important object is afforded by the structural arrangement of a resilient means in the turning roll assembly which supports a frame and associated drive wheels on a base, the resilient means tending to urge the wheels into driving engagement with the workpiece and yet yielding to compensate for surface irregularities while maintaining effective driving engagement.

Still another important object is realized by the provision of means for selectively regulating the pressure exerted by the resilient means, and thereby regulating the frictional pressure between the wheels and workpiece for optimum drive.

Another important object is achieved in that a fluid pressure hose constitutes the previously described resilient means, the hose supporting the wheel frame and wheels on the base, and by the provision of guide means interconnecting the base and frame for relative movement of the frame in a direction toward or away from the workpiece incident to adjustment of the wheels against the loading of the hose pressure.

Other important advantages are realized by the connection of a control means to the hose adapted to regulate selectively the fluid pressure in order to adjust the relative position of the frame and base and thereby adjust the degree of frictional pressure of the wheels on the workpiece.

Another important object is provided by the structural connection of the frame and base to enable the guided relative movement, frame including at least one follower received in a cooperating guideway formed on the base. More specifically, the frame has a pair of laterally projecting flanges slidably mounted in a pair of upstanding channels on the base, such structure maintaining the frame in a predetermined linear path of travel during reciprocative movement toward or away from the workpiece.

Yet another important objective is achieved by a turning roll assembly that does not in any way support the workpiece, but only acts to rotate it, the assembly including an elevating mechanism by which driving pressure between the wheels and workpiece can be regulated to maintain effective driving engagement under various operating conditions and by which such driving engagement is maintained while the position of the wheels adjusts automatically in compensating for irregularities in the workpiece surface.

An important objective is to provide a turning roll assembly of this type that is simple and durable in construction, economical to manufacture, highly efficient in operation, which is easily adjustable by anyone with a minimum of instruction for optimum drive condition under any situation and which is fully automatic in operation when so adjusted.

The foregoing and numerous other objects and advantages of the invention will more clearly appear from the following detailed description of a preferred embodiment, particularly when considered in connection with the accompanying drawings, in which:

FIG. 1 is a top plan view of an assembly for supporting and driving a workpiece;

FIG. 2 is an end elevational view of the assembly shown in FIG. 1;

FIG. 3 is an enlarged view, partly in cross section, of the turning roll assembly as seen along line 3—3 of FIG. 1;

FIG. 6 is fragmentary, diagrammatic view of the fluid system.

Figure 4:
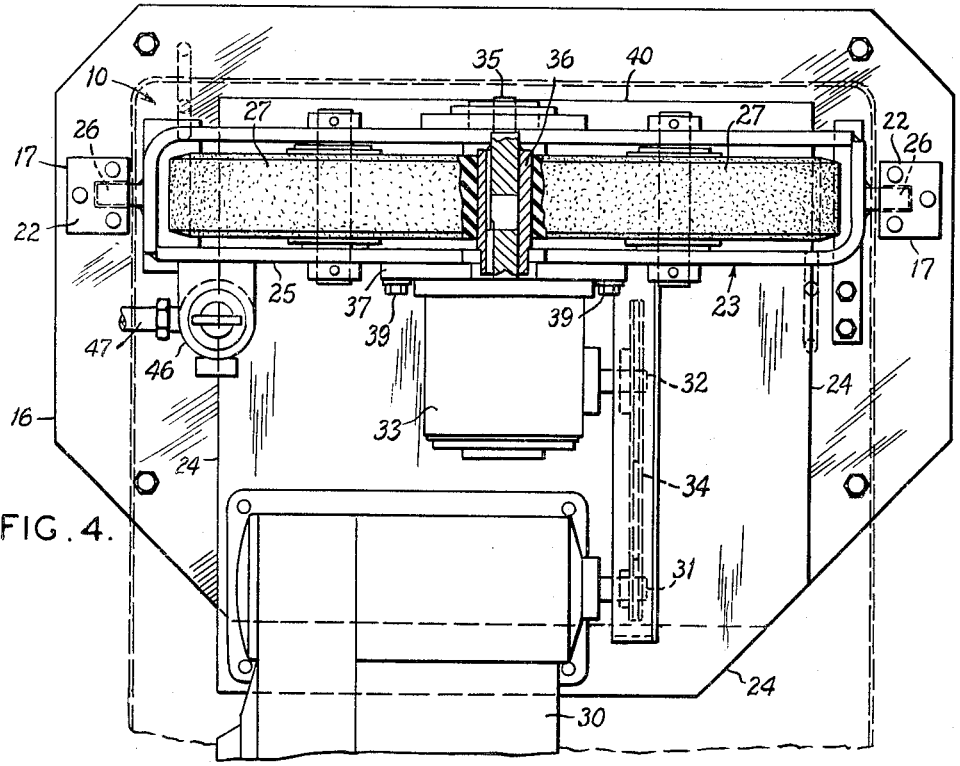
FIG. 4 is a top plan view of the roll assembly shown in FIG. 3, partly shown in the cross section for purposes of clarity.

Referring now by characters of reference to the drawings, and first to FIGS. 1 and 2, the environment of the turning roll assembly generally indicated at 10, is clearly illustrated. The workpiece referred to at 11 in FIG. 2 is shown to be a cylindrical tank supported during rotation incident to welding on a pair of spaced roll assemblies indicated at 12, one of the roll assemblies being disposed conveniently and substantially near each end of the workpiece 11.

The supporting roll assemblies 12 are identical in construction so that a detailed description of one will suffice for the other. Each supporting roll assembly 12 includes an elongate base 13 supporting a pair of box-like frames 14 that are adjustably fixed in position on such base 13. A pair of wheels 15 are rotatively mounted in each of the frames 14. The wheels 15 engaging the periphery of the workpiece 11 as is shown in FIG. 2. The idler wheels 15 are individually positionable along base 13; shifting to maintain a constant vessel centerline position so that driving assembly 10 need not be shifted laterally when idler wheel axes center distance is changed when required to suit workpiece diameter.

When the supporting roll assemblies 12 are disposed in spaced relation, as is illustrated in FIG. 1, and substantially near the ends of the workpiece 11, the workpiece 11 is rotatively supported on the idler wheels 15. It will be importantly noted that the idler wheels 15 are not powered in any way but merely serve to support the workpiece 11 and allow the workpiece 11 to rotate freely.

The turning roll assembly 10 is disposed usually between the supporting roll assemblies 12 and under the workpiece 11 as is suggested in FIGS. 1 and 2. As will appear upon later description of parts, the turning roll assembly 10 does not support the workpiece 11 but merely acts to rotate it.

The turning roll assembly 10 includes a base 16. Secured to each side of the base 16 is a channel 17 constituting a guideway. Specifically each channel 17 consists of a pair of spaced upstanding side members that are bridged at the outside by a closure member 21 and bridged at the top by an upper member 22. The channels 17 provide vertical guideways that open inwardly toward each other.

Located over the base 16 and between the channels 17 is a frame referred to at 23 including a platform 24 and a top-open box-like member 25. Extending laterally outward from each side of the box-like member 25 is a flange 26 constituting a follower that is slidably received in an adjacent, associated channel 17. It is apparent that the frame 23 is vertically movable relative to the base 16 and is guided in such movement by the reciprocative action of the flanges 26 in the guideway channels 17.

Rotatively mounted within the box-like member 25 of the movable frame 23 are a pair of drive wheels 27. The wheels 27 are located in the side by side relation in substantially the same vertical plane. The peripheries of the drive wheels 27 are preferably lined with rubber tires 28 in order to provide a good frictional contact with the periphery of the workpiece 11.

Figure 5:
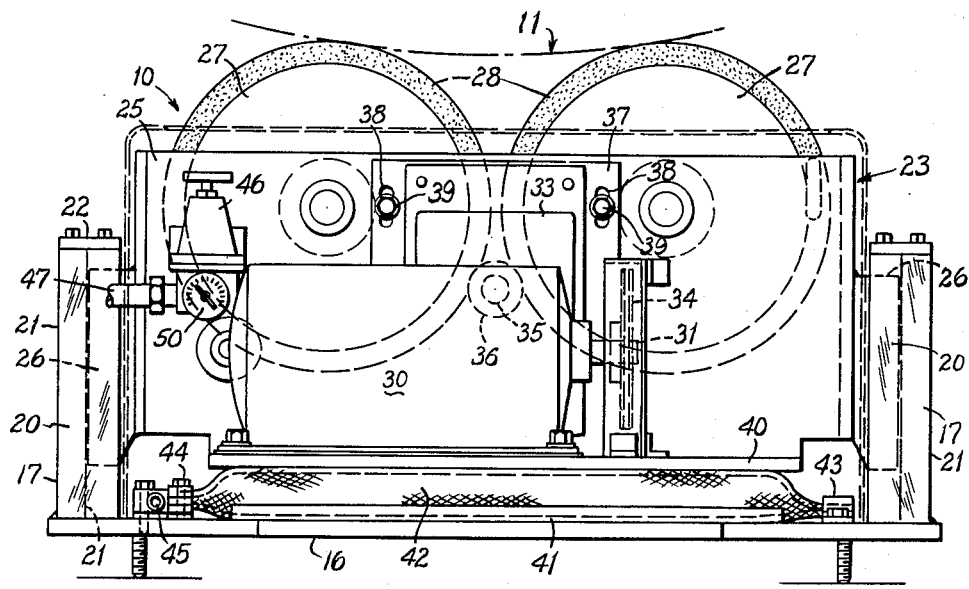
FIG. 5 is an enlarged elevational view of the turning roll assembly as seen along line 5—5 of FIG. 1.

Supported and mounted on the frame platform 24 is a drive motor 30. The output shaft 31 of motor 30 is operatively connected to an input shaft 32 of a speed reducer unit 33 by a chain and sprocket drive 34. The speed reducer 33 is attached to one side of the box-like frame member 25. The output shaft 35 of the speed reducer 33 is drivingly connected to a drive roll 36 that extends between the drive wheels 27 as is best seen in FIGS. 4 and 5. The periphery of drive roll 36 is preferably grooved to provide a good frictional contact with the rubber tire peripheries 28 of the drive wheels 27.

From the above structure, it will be readily understood that the motor 30 operates through the chain and sprocket drive 34, and through the speed reducer unit 33 to rotate the drive roll 36. Because of the pressure engagement between the drive roll 36 and the drive wheels 27, the drive wheels 27 are rotated in the same direction. When the drive wheels 27 are urged into frictional contact with the workpiece 11, the drive wheels 27 operate to turn the workpiece 11 at a predetermined speed.

From FIG. 5, it will be noted that the mounting plate 37 for the speed reducer 33 is provided with vertical slots 38 through which bolts 39 extend in attaching the speed reducer unit 33 to the box-like frame member 25. This structural arrangement allows the speed reducer 33 to be adjusted vertically in position relative to the box-like frame member 25, and thereby controls the pressure relationship between the drive roll 26 and the drive wheels 27.

The platform portion immediately below the drive wheels 27 constitutes a pressure plate 40. Similarly, the base portion immediately therebelow constitutes an opposed pressure plate 41. Disposed between the movable frame 23 and the base 16, and particularly between the opposed pressure plates 40 and 41, is a fluid pressure hose 42. The hose 42 actually supports the movable frame 23 on the base 16.

As is best seen in FIGS. 3 and 5, the hose 42 extends transversely of the base 16 and the movable frame 23 between the upstanding side channels 17. One end of the hose 42 is clamped shut by a pressure plate 43 fixed to the base 16. The opposite end of hose 42 is attached to the base 16 by a fitting 44, but is placed in communication with an inlet 45.

A pressure regulator 46 is mounted on the box-like frame member 25. A conduit 47 leading from a source of fluid pressure is connected to a spring-loaded check valve 49 and thence to the pressure regulator 46, and another suitable conduit interconnects the pressure regulator 46 with an operating valve 48, and thence with the hose inlet 45, all as is best illustrated in FIG. 6. This mechanism prevents loss of air in hose 42 should the air supply be disconnected or interrupted.

The pressure in the hose 42 can be precisely regulated by the regulator 46. Operating the valve 48 to raise the fluid pressure in the hose 42 to an extent indicated by gauge 50 will tend to urge the movable frame 23 upwardly relative to the base 16, and hence tend to urge the drive wheels 27 into engagement with the workpiece 11 with even greater pressure. Conversely, when releasing the fluid pressure in hose 42, the frictional drive pressure between the drive wheels 27 and the workpiece 11 is lessened and there is a tendency for the movable frame 23 to lower with respect to the base 16. The fluid pressure in hose 42 can be accurately controlled to raise the frame 23 and hence raise the drive wheels 27 sufficiently to provide effective drive engagement of the drive wheels 27 with the workpiece 11.

Importantly, as discussed previously, the drive wheels 27 do not support the workpiece 11 but merely operate to turn the workpiece during welding. Support of the workpiece 11 is accomplished solely by the idler roll assemblies 12. Accordingly it will be readily understood that when the drive rolls 27 encounter a surface or contour irregularity in the workpiece 11 the frame 23 will move vertically relative to the base 16 against the loading of the fluid pressure hose 42 in order to compensate for such irregularity and yet maintain effective drive engagement with the workpiece 11. The side flanges 26 will slide vertically in the channel 17 and guide the frame 23 in its movement. The resilient character of the fluid pressure hose 42 provides for an automatic height-positioning of the wheles 27 upon engagement of the wheels 27 with the workpiece surface.

It will be understood that the workpiece 11 is maintained accurately by the support wheels 15 of the idler roll assemblies 12 in welding position. Because the drive wheels 27 do not support the workpiece 11 but merely rotate it, the drive wheels 27, frame 23 and all associated parts can move vertically relative to the base 16 to enable this automatic compensation without disturbing the welding position maintained by idler roll assemblies 12.

It is thought that the operation and functional advantages of the drive roll assembly 10 and the environment in which it is utilized has become fully apparent from the foregoing detailed description of the component parts, but for completeness of disclosure the placement and usage will be briefly described.

First, the workpiece 11 is placed on the support wheels 15 of a pair of roll assemblies 12. Then, the drive roll assembly 10 is located between the support roll assemblies 12 and under the workpiece 11 as ic clearly illustrated in FIGS. 1 and 2.

The valve 48 is then actuated to introduce fluid pressure to the extent determined by regulator 46 in hose 42 sufficient to raise the frame 23 relative to base 16 and urge the drive wheels 27 into drive engagement with the periphery of the workpiece 11. The frame 23 and all of its associated supported parts are guided in this upward vertical movement by the sliding interconnection of the side flanges 26 in the upstanding channels 17. Of course, the amount of fluid pressure in hose 42 can be conveniently adjusted by the regulator 46 to give the results desired.

The motor 30 then operates through the chain drive 34 and through the speed reducer unit 33 to rotate the drive roll 36, and hence to turn the drive wheels 27 in the same direction. As the drive wheels 27 turn, they rotate the workpiece 11.

Because the drive wheels 27 do not actually support the workpiece 11, the elevating mechanism in the turning roll assembly 10 can automatically compensate for any workpiece surface irregularities. For example, if there is an outwardly projecting irregularity in the workpiece 11, the drive wheels 27 upon encountering the irregularity will tend to be forced downwardly. Consequently the entire frame 23 will move downwardly against the loading of the fluid pressure hose 42. Again, the downward movement of the frame 23 and the wheels 27 is guided by the sliding movement of the flanges 26 in the channels 17. When this particular irregularity has passed over the wheels 27, the fluid pressure hose 42 will tend to urge the frame 23 and the drive wheels 27 upwardly to the initial position. During this slight reciprocating action of the frame 23 relative to base 16, the drive wheels 27 are maintained at all times in effective driving engagement with the workpiece 11 under the loading of the fluid pressure hose 42.

Although the invention has been described by making detailed reference to a single preferred embodiment, such detail is to be understood in an instructive, rather than in any restrictive sense, many variants being possible within the scope of the claims hereunto appended.

I claim as my invention:

1. In a turning roll assembly for a workpiece:
   (a) rotative means drivingly engaging the workpiece,
   (b) guide means being connected with the rotative means for relative movement of the rotative means in a direction toward or away from the workpiece incident to moving the rotative means into or out of driving engagement with the workpiece, and
   (c) a fluid pressure hose supporting the rotative means and urging the rotative means under pressure into driving engagement with the workpiece but not under sufficient pressure to support the workpiece in a predetermined rotative axis, the rotative means being adjustably movable against the pressure of said hose to compensate for workpiece surface irregularities and yet maintain effective drive engagement.

2. In a turning roll assembly for a workpiece:
   (a) a frame,
   (b) a pair of wheels rotatively mounted on said frame in side by side relation,
   (c) means operatively connected to said wheels to rotate said wheels in the same direction,
   (d) a base,
   (e) guide means interconnecting the base and frame for relative vertical movement of the frame in a direction toward or away from the workpiece incident to moving the wheels into our out of driving engagement with the workpiece,
   (f) said frame and base having transversely extending opposed pressure plates,
   (g) a hose between said plates supporting the frame on said base and tending to urge said wheels into driving engagement with asid workpiece, and
   (h) means connected to said hose selectively regulating its fluid pressure to adjust the relative position of the frame and base and thereby adjust the pressure of said wheels on said workpiece so that the wheels drive the workpiece but do not support the workpiece in a predetermined rotative axis, said frame and wheels being adjustably movable relative to said base against the pressure of said hose to compensate for workpiece surface irregularities and yet maintain effective drive engagement.

3. In a turning roll assembly for a workpiece:
   (a) a frame including at least one outwardly extending follower,
   (b) a pair of wheels rotatively mounted on said frame in side by side relation,
   (c) drive means supported on said frame and drivingly rotating at least one of said wheels,
   (d) a base including a guideway receiving the said follower and interconnecting the base and frame for relative vertical movement of the frame toward or away from said workpiece incident to moving the wheels into or out of driving engagement with the workpiece,
   (e) said frame and base having transversely extending opposed pressure plates immediately below said wheels,
   (f) a fluid pressure hose between the plates supporting the frame on said base and urging the wheels into driving engagement with said workpiece, and
   (g) means connected to said hose selectively regulating its fluid pressure to adjust the relative position of the frame and base and thereby selectively raise the wheels into driving engagement with the workpiece but not with sufficient pressure to support the workpiece in a predetermined rotative axis, said frame and wheels being adjustably movable relative to said base against the pressure of said hose to compensate for workpiece surface irregularities and yet maintain effective drive engagement.

4. In a turning roll assembly for a workpiece:
   (a) means rotatively supporting the workpiece only and not turning it, and
   (b) a device for turning the workpiece only and not supporting it, said device including
   (c) a frame,
   (d) rotative means mounted on said frame to engage and turn said workpiece,
   (e) a base,
   (f) guide means interconnecting the base and frame for relative movement of the rotative means toward or away from the workpiece, and
   (g) a fluid pressure hose supporting the frame on said base and means connected to the hose selectively regulating the fluid pressure to raise the rotative means into driving engagement with the workpiece but not to support the workpiece in a predetermined rotative axis, said frame and rotative means being adjustably movable relative to said base against pressure of said hose to compensate for workpiece surface irregularities and yet maintain effective driving engagement.

5. In a turning roll assembly for a workpiece:
   (a) means rotatively supporting the workpiece only and not turning it, and
   (b) a device for turning the workpiece only and not supporting it, said device including a frame having at least one outwardly extending follower,
   (c) a pair of wheels rotatively mounted on said frame in side by side relation,
   (d) a drive means supported on said frame and operatively connected to said wheels to rotate said wheels in the same direction,
   (e) a base having a guideway receiving the said follower and interconnecting the base and frame for relative vertical movement incident to moving the wheels toward or away from the workpiece,
   (f) said frame and base having transversely extending opposed pressure plates, and
   (g) a fluid pressure hose between the plates supporting the frame on said base, and means connected to the hose selectively regulating the fluid pressure to raise the wheels into driving engagement with the workpiece but not to support the workpiece in a predetermined rotative axis, said frame and wheels being adjustably movable relative to said base against the pressure of said hose to compensate for workpiece surface irregularities and yet maintain effective drive engagement.

References Cited in the file of this patent

UNITED STATES PATENTS

| | | |
|---|---|---|
| 1,680,979 | Gardner | Aug. 14, 1928 |
| 2,566,674 | Odenthal | Sept. 4, 1951 |
| 2,680,607 | Hollinger | June 8, 1954 |
| 2,814,089 | Bishop | Nov. 26, 1957 |
| 2,828,027 | Stevenson et al. | Mar. 25, 1958 |
| 2,956,761 | Weber | Oct. 18, 1960 |
| 2,957,252 | Pain | Oct. 25, 1960 |
| 3,011,665 | Wise | Dec. 5, 1961 |
| 3,042,239 | Cooper | July 3, 1962 |